United States Patent [19]

Christensen et al.

[11] Patent Number: 5,577,862
[45] Date of Patent: Nov. 26, 1996

[54] UNDERGROUND CONTAINMENT FOR FLUID SYSTEMS

[75] Inventors: Jack V. Christensen, Castle Rock; Ronald T. Bloomstran, Arvada, both of Colo.

[73] Assignee: C.M.F. Corporation, Denver, Colo.

[21] Appl. No.: 381,593

[22] Filed: Jan. 31, 1995

[51] Int. Cl.⁶ .............................. B65G 5/00; G01M 3/26
[52] U.S. Cl. ......................... 405/53; 73/40.5 R; 405/128
[58] Field of Search .................................. 405/52, 53, 54, 405/128; 166/242.2, 242.4, 242.1, 902, 89.1, 374; 73/40.5 R

[56] References Cited

U.S. PATENT DOCUMENTS

| | | | |
|---|---|---|---|
| 3,063,500 | 11/1962 | Logan | 405/53 X |
| 4,462,249 | 7/1984 | Adams | 73/40.5 A |
| 4,474,053 | 10/1984 | Butler | 405/54 X |
| 4,796,676 | 1/1989 | Hendershot et al. | 141/83 |
| 4,848,456 | 7/1989 | Kilbarger | 405/54 X |
| 4,971,477 | 11/1990 | Webb et al. | 405/154 |
| 5,031,697 | 7/1991 | Wellington et al. | 166/250.08 X |
| 5,098,221 | 3/1992 | Osborne | 405/52 |
| 5,131,468 | 7/1992 | Lane et al. | 166/120 |
| 5,207,530 | 5/1993 | Brooks et al. | 405/53 X |
| 5,263,794 | 11/1993 | Webb | 405/52 |
| 5,297,896 | 3/1994 | Webb | 405/52 |

*Primary Examiner*—Stephen J. Novosad
*Attorney, Agent, or Firm*—John O. Mingle

[57] ABSTRACT

A potentially economically viable apparatus is provided for the containment and detection of underground leaking fluids by employing a wrapper, often in the form of a conduit, to enclose the underground portion of a hydraulic fluid system. An important application is the detection and containment associated with an underground elevator system using hydraulic oil.

4 Claims, 1 Drawing Sheet

UNDERGROUND CONTAINMENT FOR FLUID SYSTEMS

BACKGROUND OF INVENTION

1. Field of Invention

The present invention relates to an enclosure for avoiding leakage of fluid into the ground environment with emphasis upon hydraulic elevator fluid containment. Further the invention allows a positive test to insure continuing containment.

2. Background

Current increased awareness recognizes that an underground system containing hazardous fluids can become an environmental problem if the system leaks. Much emphasis has been expended to design systems to dispense gasoline from underground tanks in response to the Federal Environmental Protection Agency as well as many state laws and regulations. Other hazardous fluids are also receiving increased attention.

A particular situation involving a hazardous fluid is the fluid utilized in hydraulic ram elevators. Hydraulic elevators have been employed from many decades and one of the most successful of its early uses was to provide lift for aircraft carriers between the flight deck and the aircraft storage and maintenance levels.

Because such elevators in commercial applications must extend upward several floors, the hydraulic ram cylinder is buried a similar distance underground creating a potential environmental problem, especially to ground water, if the cylinder develops fluid leaks.

With the hydraulic ram system, such ram rides in a cylinder and is moved by hydraulic fluid pressure of up to design conditions of 650 psi; however, actual operating pressures more normally range up to about 450 psi. Any missalignment of the ram and its cylinder can result in sufficient friction over time resulting in the possible wearing through of the cylinder wall and fluid leakage underground. The repair of such a breached cylinder often results in pulling of the whole elevator assembly which is very expensive particularly if the roof of the building is breached to allow large crane access. Of course the hydraulic seals, piping, valves and pump can all obtain leaks over time, but these are well positioned for monitoring and repair.

Because of the design of hydraulic elevators secondary containment systems are only located outside of the cylinder; inner linings used as containment, if they are at all feasible, are difficult to install and maintain.

Corrosion problems are a very big, and expensive, aspect of hydraulic elevators. With much ground water normally in contact with the hydraulic ram outer cylinder, electrolytic corrosion often eats through this cylinder wall, especially since these elevators are expected to last the life of the building, which is likely 50 or more years. Thus hydraulic fluid leakage in old elevators is common.

When working underground it is common to line pipe trenches with a flexible membrane to attempt to contain leakage. This attempt makes it difficult to monitor integrity as well as requiring separate installation steps. It is not a useful approach with hydraulic elevators that require containment integrity measurements and are typically installed in one piece because of water flooding of the drilled hole.

Related United States patents that disclose containment ideas include:

| U.S. Pat. No. | Year | Inventor |
| --- | --- | --- |
| 4,462,249 | 1984 | Adams |
| 4,796,676 | 1989 | Hendershot et al |
| 4,971,477 | 1990 | Webb-1 et al |
| 5,098,221 | 1992 | Osborne |
| 5,263,794 | 1993 | Webb-2 |
| 5,297,896 | 1994 | Webb-3 |

Referring to the above list, Adams discloses a tank leakage detection method where leakage perforates the tank allowing air outside the tank to leak in when the tank's own pressure is lowered and in so doing forms air bubbles that are acoustically detected. A special acoustical detector is required as well as equipment for creating a vacuum on said tank.

Hendershot et al disclose a fluid storage tank system containing a rigid external primary tank with flexible secondary inner-lining. Negative pressure formed by a vacuum between them is monitored and decreases if fluid leaks. The tank has a difficult to install inner-lining and requires vacuum conditions.

Webb-1 et al disclose a secondary contained fluid supply system having two chambers connected with pipe using a second flexible inner pipe that is removable by access through a chamber. The containment is a double pipe arrangement but monitoring is difficult unless the flexible pipe is removed. This is designed to move liquids such as gasoline from underground tanks to an above-ground dispenser.

Osborne discloses a flexible double-containment piping system for underground storage tanks using double pipe containment having quick-disconnect coupling. This system is designed primarily for gasoline tanks using an above-ground dispenser.

Webb-2 discloses an environmentally safe underground piping system having an outer rigid pipe with flexible inner tube to carry fluid. Accent is on quick connections. This is an improvement on Webb-1 et al and is designed to move liquids such as gasoline from underground tanks to an above-ground dispenser.

Webb-3 discloses environmentally safe underground piping system using a double-walled pipe with gravity flow of leaking fluid through the outer pipe back to the storage tank. Sump pit detects leakage. This is an improvement to Webb-2 and is designed to move liquids such as gasoline from underground tanks to an above-ground dispenser.

SUMMARY OF INVENTION

The objectives of the present invention include overcoming the above-mentioned deficiencies in the prior art and providing a potentially economically viable apparatus for the containment and detection of underground leaking fluids particularly hydraulic elevator oil.

DETAILED DESCRIPTION OF INVENTION

The invention was an apparatus serving as an enclosure or containment for a hydraulic elevator underground fluid system which comprised a capped conduit made of material resistant to underground corrosion fitting over the outer cylinder of said system wherein said conduit was of sufficient size to leave a gas space between said conduit and said outer cylinder. A plurality of structural supports was mounted in an overlapping pattern on said outer cylinder of said system that firmly braced said conduit from deforming wherein each support contained an air or gas passage. Means for sealing said conduit to said outer wall at edges of said material was provided thereby containing up to about 100 psi gas pressure. Means for changing the pressure of said gas space was utilized. Means for measuring said gas pressure over a time period of up to about one hour was further utilized.

Figure 1:
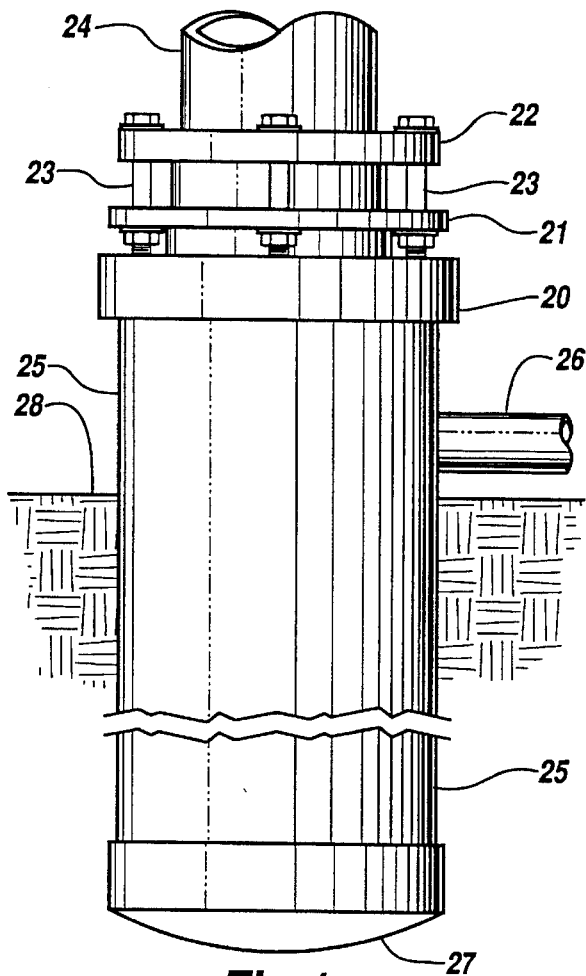
FIG. 1 shows a conventional hydraulic ram without containment protection for hydraulic fluids.

FIG. 1 shows the hydraulic cylinder without any containment and represents the common apparatus buried below ground, sometimes up to about 70 feet if the elevator must serve many floors. Here the main outside cylinder 25 which is often common material, such as schedule 40 black pipe, is exposed to the ground environment and any breach of said cylinder will leak the elevator hydraulic fluid into the ground. The bottom of this cylinder is capped with a conventional pipe cap which is also exposed to the ground environment. The other parts shown in FIG. 1 represent conventional hydraulic ram system components, such as the pipe 26 leading to the hydraulic fluid reservoir; the main hydraulic ram 24 that lifts the elevator; the conventional stuffing gland has a pressure ring 21 held tight by bolts 23 to a packing head 22 which fits inside the outer cylinder 25. This stuffing gland uses conventional packing material such as rubber and rigid plastic and is designed to hold the design hydraulic pressure of up to 650 psi. An excess oil ring 20 contains any leaking oil.

Figure 2:
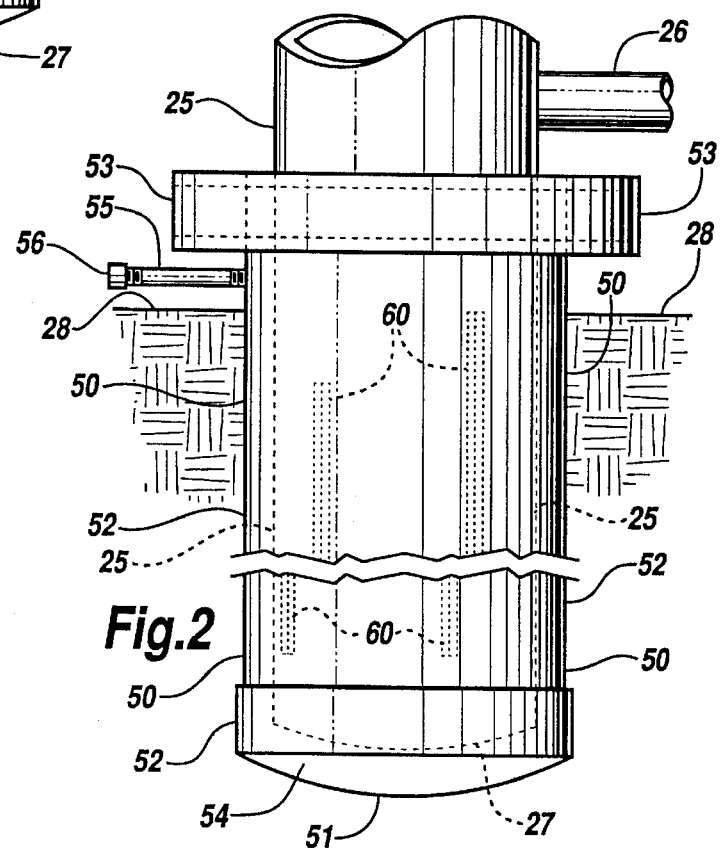
FIG. 2 shows an improved hydraulic ram with containment protection for hydraulic fluids.

The plurality of structural supports, 60 in FIG. 2, represent any firm material that will keep the conduit from collapsing onto the cylinder, such as but not limited to angle-iron pieces or other type ribs. Depending upon the curvature of the cylinder, the angle of the angle-iron is adjusted away from its normal ninety degrees in order to allow a reasonable, but not excessive, gas space, often filled with air. Often the length of these supports is about up to about one-third of said conduit length and they are fixed in place, such as but not limited to by welding. The pattern is often radially staggered around the cylinder as shown in FIG. 2. Normally such support pattern extends for approximately ninety percent of said conduit length.

The capped conduit is made of material resistant to underground corrosion, such as but not limited to polyvinylchloride (PVC) pipe with a PVC end cap. This PVC pipe is manufactured in various diameters, wall thicknesses, and lengths and these parameters are not critical with the exception of being able to seal adequately so as to contain 100 psi gas pressure. This seal between the conduit made of PVC and the outer cylinder, which is often black pipe for many elevator installations, represents a conventional seal, such as but not limited to use of a multiple rod stuffing gland. The gas tight seal is important in order to allow the testing procedure to work properly. However since this seal is often between metal and plastic, it is a common source of leakage as time passes. Alternate sealing procedures, besides the multiple rod stuffing gland noted above, include, but are not limited to, a specially formed rubber or plastic stuffing gland using packing material in various combinations of rigidity and pliability, a press-fit stuffing gland by manipulation of the capped conduit diameter, and use of certain adhesives which often complement other sealing procedures.

The end cap is sealed with a common PVC pipe sealant, such as but not limited to PVC cement. However if a long cylinder is used for a multiple story elevator, splicing of lengths of PVC pipe together often becomes necessary, and this splice must maintain the needed gas pressure as well as not structurally buckle when placed around the cylinder. Besides PVC cement, often a plastic-like foam, such as but not limited to rigid polyurethane, is utilized for this splice thus sealing off much of the gas flow at this point; however, the angle-iron supports underneath this foam slice are installed in a manner to allow the needed gas or air passage.

FIG. 2 shows the hydraulic cylinder of FIG. 1 with the protecting underground containment provided by a conduit of material that resists underground corrosion, such as electrolysis. Here the main outside cylinder 25 which is often common material, such as schedule 40 black pipe, is protected from the ground environment by a conduit 50 that resists corrosion, such as PVC schedule 40 pipe, along with its dome PVC cap 51, also schedule 40. Said conduit 50 is sealed to the ram outer cylinder 25 in such a manner to hold up to 100 psi gas pressure within the enclosed space 52. This seal 53 is often a common pressure stuffing gland with its pressure ring held tight by bolts through a packing head, and is similar to the elevator hydraulic fluid stuffing gland as shown in FIG. 1; however, it needs to only hold 100 psi of gas pressure. Optionally a metal band is placed over this seal 53 to prevent any cracking of the conduit 50 especially if it is made of plastic. This seal 53 is normally positioned above the ground interface 28 at least by several inches but larger clearances are employable, or if below ground, in a position where it is easily checked for integrity.

In many instances, especially with hydraulic elevators that are designed to serve many floors, it becomes necessary to structurally enhance the arrangement, especially for transportation integrity, and gas space 52 between the dome cap 51 and the cylinder pipe cap 27 is filled with rigid foam 54, such as but not limited to rigid polyurethane. Further structural enhancement is provided by support ribs 60 that are attached to the outer cylinder 25 in such a manner as to leave a gas cavity but still firmly support the conduit 50. Other components shown include the hydraulic fluid system pipe 26 and the gas supply line 55 with cap 56 which is removed and a pneumatic coupling installed during gas testing.

The containment integrity measurement was performed on an as needed basis. The elevator was shut down and the hydraulic pressure released. The gas space between the hydraulic ram outer cylinder and the containment conduit was pressurized with air to about 60 psi. Because of the presence of any rigid foam around the bottom dome cap, it often took sometime before the pressure became stabilized even with no leaks present. After such stabilization of pressure, it then was monitored up to about one hour for any further change. If the pressure decreased, then air was leaking either into the hydraulic cylinder, leaking out a breached conduit wall, or leaking out the seals between the conduit material and the cylinder wall. With experience the rate of this pressure leakage can often identify which type of leak was occurring. Alternatively if the pressure increases when the hydraulic pressure was restored, then definitely leakage of hydraulic fluid into the air space occurred and the cylinder wall had been breached. In any case potential repairs were needed.

In the case of hydraulic fluid leakage through the cylinder wall, considerable fluid accumulates in the gas space region between the cylinder wall and the conduit. Procedures to remove this fluid often involve the repair of the cylinder; however, optionally the air pressure connector is changed to a hydraulic fluid pump connector with a long supply tube.

The secondary containment concept is generalizable for any fluid system buried underground that has an external wrapper or other housing that is potentially flexible if deemed appropriate. An apparatus serving as an integument for a fluid system installed underground comprising a wrapper made of material resistant to underground corrosion encompassing the part of said system that resides underground while leaving a gas space between said material and outer walls of said system; means for sealing said wrapper to said outer walls at edges of said material thereby containing up to about 100 psi gas pressure; and means for changing the pressure of said gas space. Alternatively adding means for measuring said gas pressure over a fixed time period is feasible. The wrapper is potentially flexible but is rigid if necessary; however, it is common to have the portion of said wrapper that is buried the deepest to be rigid. Further if a flexible wrapper is utilized and a rigid section is required, a foam plastic, such as but not limited to rigid polyurethane, is positioned to give the required support while still maintaining the needed gas space to allow testing. The wrapper seals are often positioned above ground but this is not a fixed requirement; however, it is common to place these seals so that inspection is easy to perform. Both positive and negative gas pressures are allowable giving a high degree of flexibility in measurement techniques. Further any gas, including but not restricted to air, is employable and is selected based upon safety, upon the type of fluid that is contained, and the ease with which any such leaking gas is detectable.

The foregoing description of the specific embodiments will so fully reveal the general nature of the invention that others can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

We claim:

1. An apparatus serving as an containment for a hydraulic elevator underground fluid system comprising:

a capped conduit made of material resistant to underground corrosion fitting over the outer cylinder of said system wherein said conduit is of sufficient size to leave a gas space between said conduit and said outer cylinder;

a plurality of structural supports mounted in an overlapping pattern on said outer cylinder of said system that firmly braces said conduit from deforming wherein each support contains a gas passage;

means for sealing said conduit to said outer wall at edges of said material thereby containing up to about 100 psi gas pressure;

means for changing the pressure of said gas space; and means for measuring said gas pressure over a time period of up to about one hour.

2. The apparatus according to claim 1 wherein said supports further comprise angle-iron pieces of length up to about one-third of said conduit length welded in a radial staggered pattern onto said outer cylinder for approximately ninety percent of said conduit length.

3. The apparatus according to claim 1 wherein said capped conduit made of material resistant to underground corrosion further comprises polyvinylchloride pipe with end cap.

4. An apparatus serving as an integument for a fluid system installed underground comprising:

a flexible enclosure containing structural supports made of material resistant to underground corrosion encompassing the part of said system that resides underground while leaving a gas space between said material and outer walls of said system;

means for sealing said flexible enclosure to said outer walls at edges of said material thereby containing up to about 100 psi gas pressure; and means for changing the pressure of said gas space.

* * * * *